United States Patent
Geiginger et al.

[11] Patent Number: 5,866,992
[45] Date of Patent: Feb. 2, 1999

[54] CONTROL SYSTEM FOR SEVERAL APPLIANCES IN DISTRIBUTED ARRANGEMENT, AND METHOD FOR SETTING SUCH A CONTROL SYSTEM INTO OPERATION

[75] Inventors: Joachim Geiginger, Hohenems; Walter Werner, Dornbirn, both of Austria

[73] Assignee: Zumtobel Licht GmbH, Dornbirn, Austria

[21] Appl. No.: 765,612
[22] PCT Filed: Jun. 8, 1995
[86] PCT No.: PCT/EP95/02218
§ 371 Date: Dec. 23, 1996
§ 102(e) Date: Dec. 23, 1996
[87] PCT Pub. No.: WO96/00459
PCT Pub. Date: Jan. 4, 1996

[30] Foreign Application Priority Data
Jun. 24, 1994 [DE] Germany ............... 44 22 215.7

[51] Int. Cl.⁶ .............. G05B 23/02; G08C 19/00
[52] U.S. Cl. .............. 35/294; 315/149; 340/825.06
[58] Field of Search .............. 315/291, 292, 315/293, 294, 312, 316, 317, 318, 319, 149, 152, 155; 340/825.06, 825.07, 825.69, 825.22

[56] References Cited
U.S. PATENT DOCUMENTS
5,352,957 10/1994 Werner ............... 315/291
5,565,855 10/1996 Knibbe ............... 340/825.06

Primary Examiner—Don Wong
Assistant Examiner—David H. Vu
Attorney, Agent, or Firm—Fitzpatrick, Cella, Harper & Scinto

[57] ABSTRACT

In a system for the control of several appliances (1–5), in particular light fittings distributed in several rooms (A, B, C), from a central command generator (10, 11), and with a method for setting this system into operation, one of the appliances (5) is selected and monitored for the issue of an externally detectable identification signal. All appliances (1–5) already have, before installation of the system, an original address (U4, U2, U1, U5, U3) and are installed without regard to these original addresses. After the installation, the original addresses (U4, U2, U1, U5, U3) are chosen one after the other, and the associated appliances (1–5) instructed to identify themselves. When the selected appliance (5) identifies itself, there is transmitted thereto a preset operational address (B5). This method is then repeated with other selected appliances (1–5), until all appliances have operational addresses (B1–B5). The appliances (1–5) can then be purposively selected, with regard to the site of installation or in terms of groups, using this operational address (B1–B5).

15 Claims, 1 Drawing Sheet

CONTROL SYSTEM FOR SEVERAL APPLIANCES IN DISTRIBUTED ARRANGEMENT, AND METHOD FOR SETTING SUCH A CONTROL SYSTEM INTO OPERATION

BACKGROUND OF THE INVENTION

1. Field of the Invention

The invention relates to a control system for several appliances in distributed arrangement, in particular lighting fittings in one or more rooms, and a method for setting such a control system into operation.

The present invention relates to an improvement of the known system and method.

2. Description of the Related Art

From EP 0 433 527 there is known a method of setting into operation a control system for several appliances in distributed arrangement, in particular light fittings in one or more rooms, which appliances contain a stored original address and, after their installation has taken place without regard to the original address, are to be controllable from at least one command generator via a common control line, having the following steps:

a) the command generator instructs all appliances to transmit their original addresses and stores these original addresses;

b) one of the stored original addresses is chosen by the command generator with the command that the associated appliance should deliver an externally detectable identification signal, c) all of the appliances are externally monitored for the identification of the one appliance, d) after identification of the one appliance there is entered into the command generator an operational address associated with this appliance, which takes into account a particular grouping and/or arrangement of the appliances after the installation of the system, e) the identified appliance is selected by the command generator by way of its original address, and there is transferred to the appliance, for storage, the entered operational address, f) steps a) to e) are repeated until operational addresses have been transferred to all appliances.

The main advantage of the known control system, and of the method of setting into operation such a control system, is that the appliances—although they can be installed without consideration being given to their original addresses—can, after the setting into operation of the system, be selected in an aimed manner via their operational addresses taking into consideration various selection criteria.

However, the known system and the method for setting the system into operation have the disadvantage, in particular in the case of large buildings with many appliances, that an appliance which has identified itself—e.g. a light fitting that has been controlled to be brighter—must be sought over the whole building and there is no indication where the search should be begun, since the selection of the appliances by the command generator via their original addresses in accordance with step b) of the known method occurs practically randomly.

SUMMARY OF THE INVENTION

A object of the present invention is to improve the control system and the method for setting the control system into operation to the effect that the above-described disadvantage is avoided and the bringing into operation is simplified and takes less time.

This object is achieved in accordance with the invention by means of an identification detector connected with a command generator so that, by means of the identification detector the identification of selected appliances can be determined, and by means of which the command generator is caused, upon identification of the selected appliance, to write into a memory of the appliance, its operational address and to preset the address in the command generator.

According to a further feature of the invention, there is provided an externally accessible receiver, such as a light sensor, by means of which a command can be given to transmit the original address to the command generator. In respond to such command, the command generator transmits a preset operational address to the selected appliance for writing into the memory of the appliance. Alternatively, the operational address can be directly delivered to the selected appliance for writing into the memory of the appliance by an external transmitter.

According to another aspect of the invention there is provided a novel method for setting into operation a control system for several appliances in distributed arrangement. This novel method involves first, the step of causing a command generator to instruct all appliances to transmit their original addresses to be stored in the command generator. Then, one appliance is selected and an operational address associated with the selected appliance is preset in the command generator. Different original addresses are chosen, one after the other, by the command generator with the command that the associated appliance should issue an externally detectable identification signal. The selected appliance is ex ternally monitored for its identification; and upon identification, the preset operational address is transmitted to the selected appliance for storage. The foregoing steps are repeated with each of the selected appliances until operational addresses have been transmitted to all of the appliances.

In contrast to the known control system and the method of setting the same into operation, with the new control system and the method for setting it into operation the totality of the appliances is no longer monitored, but in each case now only a selected appliance. For this, the associated operational address is preset in the command generator. The appliances are then instructed one after the other, by way of their original addresses, to identify themselves. When the selected appliance identifies itself, its operational address is transferred to it. The monitoring of the selected appliance and the transfer of the operational address associated with it can be effected automatically. It is clear that thereby the previously necessary search for the appliance identifying itself can be omitted and that through the presetting of the operational address in the command generator and the possible automatic linking of monitoring and transfer of the preset operational address considerable time can be saved.

According to a specific expedient, the control system is used in the situation where the appliances are light fittings.

According to further features, the method of the invention can be shortened. In addition, the invention in another specific aspect takes account of the case that after the first instruction from the command generator to the appliances to transmit their original addresses, not all original addresses are correctly received and stored.

The invention, in another aspect relates to an alternative to method in accordance with which it is no longer necessary that the command generator first stores a list of all original addresses. Still further specific features provide techniques whereby the appliances identify themselves by means of an optically detectable identification signal. In the case of a light fitting, its identification can for example be effected by means of a variation of its brightness, in particular by means of switching on, switching off or dimming.

There is also obtained with this invention the variant that each appliance is provided with an externally accessible receiver, for example a light sensor in the form of a photodiode. The command to the selected appliance, to transmit the original address to the command generator, can then be transferred by means of a transmitter outside of the system, for example a light emitter directed at the photodiode, whereupon the command generator then immediately transfers the preset operational address to the selected appliance. In this case, the identification signal detector with a targeting device can be omitted.

Further, the present invention provides that the operational address is directly delivered to the just-described, externally accessible receiver of the selected appliance by means of the transmitter outside the system, for example the light emitter, in that the light beam is correspondingly coded by means of modulation.

The two last-described possibilities require, however, at least one additional component in each appliance, namely an externally accessible receiver.

An exemplary embodiment of the invention will be described below with reference to the drawing.

DETAILED DESCRIPTION OF THE PREFERRED EMBODIMENT

Figure 1:
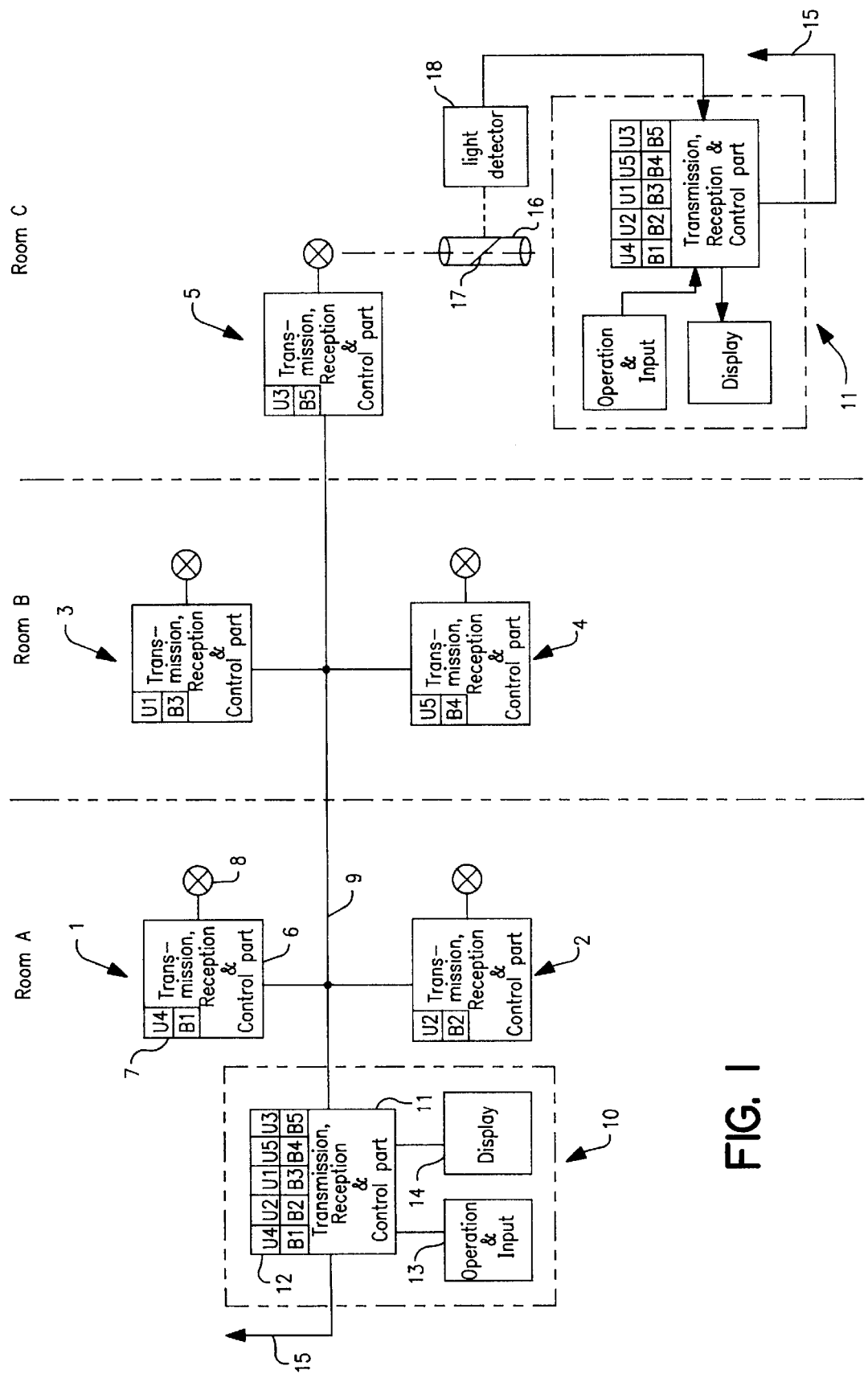
FIG. 1 shows three rooms A, B and C. In room A there are installed two appliances 1 and 2. In room B two appliances 3 and 4 are installed. In room C there is installed a single appliance 5. For reasons of simplified representation, the appliances 1 to 5 are identical, and only appliance 1 will be described. However, the appliances may also be different.

The appliance 1 is a light fitting, consisting of a transmission, reception and control part 6, which contains a memory 7 and controls a lamp 8.

The appliances 1 to 5 are connected with a command generator 10 via a common control line (bus).

The command generator 10 consists of a transmission, reception and control part 11 having a memory 12. An operation and input part 13, and a display 14, are connected with the transmission, reception and control part 11.

The command generator 10 is fixedly installed in room A.

A mobile command generator 11 is located in room C, which mobile command generator is in principle constructed the same as the command generator 10. A description can thus be omitted. The two command generators 10 and 11 are coupled with one another in a wireless manner, for example by means of an antenna 15. The command generators 10 and 11 can, however, also be coupled with one another via the bus. In this case, bus sockets are provided at which the mobile command generator can be linked to the bus.

First, the appliance 5 is selected for the purpose of monitoring for its identification. It is thus the "selected" appliance. For this purpose, the lamp is sighted with a targeting device 16 of the manner of a telescope.

The targeting device 16 contains a semi-transparent mirror 17 with which the light coming from the lamp is directed onto a light detector 18. This generates an identification signal therefrom, which signal is supplied to the command generator 11.

Below, a first variant of the setting into operation of the above-described control system will be explained.

Before installation, respective original addresses are written into the memory 7 of the five appliances 1 to 5. Thus, the appliance 1 contains the original address U4, the appliance 2 the original address U2, the appliance 3 the original address U1, the appliance 4 the original address U5 and the appliance 5 the original address U3. Then, the five appliances are installed in the three rooms A, B, C in the illustrated manner, in particular without regard to their original addresses. After the installation, the five appliances 1 to 5 are connected with the command generator 10 via a common control line 9.

The memory 12 of the command generator initially contains no addresses.

Now, by means of the operation and input part 13, the command generator 10 is caused to instruct the appliances 1 to 5 to transmit their original addresses. The transmitted original addresses U1 to U5 are stored in the memory 12 of the command generator 10.

When, upon the transmission of the original addresses, there arises a data collision on the common control line 9, the command generator 10 stores only the correctly transmitted original addresses and then repeats the instruction to the appliances for transmission of the original addresses until all original addresses U1 to U4 are stored in the command generator 10.

The next step is that an appliance is selected. In the present case, this appliance is the appliance 5 located in the room C. For this purpose, the targeting device 16 is directed at the lamp. Further, an operational address for the appliance 5 is preset in the mobile command generator 11, which operational address is B5 in the present case. The operational address makes it possible to later purposively select the appliance in the relevant room at its place of location, when desired within the scope of a group of appliances.

Now, by means of the operation and input part, the command generator 11 (and because of the radio connection therewith also the command generator 10) is caused to select the stored original addresses U4, U2, U1, U5, U3 one after the other and to instruct the associated appliances to identify themselves. Instead of the above-mentioned sequence, any other sequence can also appear.

In the present case, the identification is effected by means of reducing (dimming) the brightness of the lamp. Thus, first the lamp of appliance 4, then the lamp of appliance 2, then the lamp of appliance 1 and then the lamp of appliance 5 is dimmed for the purpose of identification. When the reduction of the brightness of the lamp of the appliance 5 is detected by the light detector 18, it reports this to the command generator 11. In response, the command generator automatically issues the preset operational address B5 to the control line 9, so that the selected appliance 5 can receive and store this operational address.

Expediently at this point the above-described procedure of successive identification of the appliances is interrupted, in order to shorten the method.

Likewise expediently, the original address U3 of the appliance 5 is eliminated from the list of those appliances which are to be instructed to identify themselves in the next cycle.

Now, the mobile command generator 11, with the target device 16 and the light detector 18, is moved for example into room B, there to monitor the appliance 4 as the "selected" appliance.

Now, the operational address B4 is preset in the command generator 11 for the appliance 4. Then, the above-described procedure is repeated, so that all appliances (preferably with the exception of appliance 5) are instructed to identify themselves. When the appliance 4 identifies itself, the identification procedure is interrupted and the preset operational address B4 is automatically transferred to the appliance 4 and stored there.

After operational addresses have been entered in all appliances, in the above-described manner, each appliance—if appropriate together with other appliances—can be purposively selected by means of its operational address.

Below, a second method variant will now be described, which differs from the first described method variant in that the storing of all original addresses in the command generator at the beginning of the method can be omitted.

For the first "selected" appliance 5, the associated operational address B5 is first preset in the command generator 11. Then, the command generator 11 is caused to instruct all appliances to transmit their original addresses. The first correctly received original address, or one original address selected by the command generator from several correctly received original addresses, is stored by the command generator. The stored original address is then chosen, and the associated appliance instructed to identify itself.

For example, the original address U5 is initially the first correctly received original address and is stored in the command generator. This original address U5 is then chosen, whereby the appliance 4 identifies itself. Since the light detector 18, which is monitoring the selected appliance 5, reports no identification, the command is given to the appliance 4—by way of the original address U5—not to participate in the next call for transmission of original addresses.

With the next call for transmission of the original addresses, the original address U3, for example, is received as the first correct original address and is stored by the command generator. Thus, there is effected an identification of the appliance 5, which is reported by the light detector 18. In response, the operational address B5 is automatically transferred to the appliance 5 under the original address U3. Further, the appliance 5 is instructed not to participate in the next call for transmission of original addresses; and there is issued to all other appliances the instruction that an earlier command no longer to send original addresses is rescinded (in the present case this applies to appliance 4).

Now, the targeting device 16, the light detector 18 and the mobile command generator 11 are again moved into the room B, for example to monitor the appliance 4 as a "selected" appliance with regard to its identification. The method described for appliance 5 is now repeated for the 4, whereby 4, whereby the appliance 5 finally ignores an instruction for transmission of original addresses.

The above-described steps are repeated until operational addresses have been entered into all appliances.

In conclusion, it is also noted that the two command generators 10 and 11 always compare with one another, i.e. are always in the same memory condition. Of course, the described method can also be carried out with only a single command generator. It is also conceivable that only one of the two command generators has a memory, and that the other accesses this memory by remote means (e.g. radio, bus . . . ).

It is also to be noted that the operational address can be written into the memory of an appliance alongside the original address, or in place of the original address, whereby the original address is erased.

Further it can be provided that the operational addresses do not need to be manually set but are read from an electronically stored list, or that the operational addresses are automatically incremented or decremented.

Further it is advantageous when—upon being set into operation—the command generator instructs only those appliances to transmit their original addresses which do not yet have a stored operational address. This speeds up in particular the bringing into operation of appliances subsequently connected to the installation.

We claim:

1. Control system for several appliances in distributed arrangement, each appliance having a transmitter, a receiver and a memory, said system comprising:

at least one command generator with a transmitter, a receiver and a memory;

a control line which connects the command generator with each appliance;

the memory of each appliance containing an original address which is entered into the memory of the respective appliance before the setting into operation of the system, which original address permits an identification of the appliance upon being chosen by means of the command generator;

the memory of each appliance also containing an operational address which is written into the memory after the setting into operation of the system and after identification of the appliance, which operational address takes account of a particular grouping and arrangement of the appliances after installation of the system; and an identification detector, connected to the command generator, by means of which detector the identification in each case of a selected appliance can be determined by way of monitoring the identification signals the appliances deliver due to their addressing according to their original addresses through the command generator, and by means of which detector the command generator is caused, upon identification of the pre-selected appliance, to write into the memory of the pre-selected appliance the operational address associated with the appliance and preset in the command generator, when said appliance is identified by means of the identification detector.

2. Control system according to claim 1, wherein, the identification detector is sensitive with regard to optical identification signals, and has an optical targeting device by means of which the selected appliance can be sighted.

3. Control system for several appliances in distributed arrangement, each appliance having a transmitter, a receiver and a memory, said system comprising:

at least one command generator with a transmitter, a receiver and a memory;

a control line which connects the command generator with each appliance;

the memory of each appliance containing an original address which can be written into the memory of such appliance, before the setting into operation of the system, which original address permits an identification of the appliance upon being chosen by means of the command generator;

the memory of each appliance also being capable of receiving an operational address which can be written into the memory after the setting into operation of the system and after identification of the appliance, which operational address takes account of at least one of a particular grouping and arrangement of the appliances after installation of the system; and each appliance being provided with an externally accessible receiver, by means of which there can be transmitted to the selected appliance by means of a transmitter external to the system, a command to transmit the selected appliance's original address to the command generator, in response to which the command generator then transmits the preset operational address to the selected appliance for writing into the memory of the appliance.

4. Method for setting into operation a control system for several appliances in distributed arrangement, which appliances have original addresses stored and are—after their installation, which is effected without regard to the original addresses—to be controllable from at least one command generator via a common control line according to the following steps:

a) causing the command generator to instruct all of the appliances to transmit their original addresses and to store these original addresses;

b) selecting one appliance, and presetting in the command generator an operational address associated with the selected appliance;

c) causing the command generator to choose different original addresses one after the other with commands that the associated appliance should issue an externally detectible identification signal;

d) externally monitoring the selected appliance for its identification;

e) after identification of the selected appliance, transmitting the preset operational address to the selected appliance for storing; and f) repeating the steps b) to e) with another selected appliance until operational addresses have been transmitted to all appliances.

5. Method according to claim 4,
wherein,
step c) is interrupted after identification of the selected appliance.

6. Method according to claims 4 or 5,
wherein,
step a) is repeated if not all original addresses are correctly received and stored by the command generator, and in that the repetition is effected until all original addresses are stored in the command generator.

7. Method according to claim 4 or claim 5,
wherein,
after step e) has been carried out, the original address of the selected appliance in the command generator is deleted.

8. Method according to claim 4 or claim 5,
wherein,
the original addresses for step c) are chosen in accordance with at least one of a particular program and a list of original addresses stored in the command generator.

9. Method for setting into operation a control system for several appliances in distributed arrangement, which appliances have original addresses stored and are—after their installation, which is effected without regard to the original addresses—to be controllable from at least one command generator via a common control line, having the following steps:

a) presetting in the command generator an operational address associated with the selected appliance;

b) causing the command generator to instruct all appliances to transmit their original addresses and to store a correctly received original address;

c) causing the command generator to chose the stored original address with the command that the associated appliance should issue an externally detectable identification signal;

d) externally monitoring the selected appliance for its identification;

e) repeating steps b) to d) until the selected appliance identifies itself, then transmitting the preset operational address thereto for storing; and f) repeating steps a) to e) with another selected appliance, until operational addresses have been transmitted to all appliances.

10. Method according to claim 9,
wherein,
the command generator is caused to issue to the appliance in each case associated with the first received original address, the command to ignore the next instruction of the command generator for transmission of the original addresses until this command is rescinded, and in that this command is rescinded by the command generator after identification of an appliance.

11. Method according to one of claims 4, 5, 9 and 10,
wherein,
the appliances are caused to identify themselves by means of an externally detectable optical identification signal.

12. Method according to claim 11,
wherein,
the appliance is a light fitting and in that its brightness is altered for the purpose of its identification.

13. Method according to one of claims 4, 5, 9 and 10,
wherein,
the monitoring of the selected appliance and the transmission of the preset operational address after its identification is carried out automatically.

14. Control system for several appliances in distributed arrangement, each appliance having a transmitter, a receiver and a memory, said system comprising:

at least one command generator with a transmitter, a receiver and a memory;

a control line which connects the command generator with each appliance;

the memory of each appliance containing an original address which can be written into the memory of such appliance before the setting into operation of the system, which original address permits an identification of the appliance upon being chosen by means of the command generator;

the memory of each appliance also being capable of receiving an operational address which can be written into the memory after the setting into operation of the system and after identification of the appliance, which operational address takes account of at least one of a particular grouping and arrangement of the appliances after installation of the system;

each appliance being provided with an externally accessible receiver, by means of which an operational address can be directly delivered to the selected appliance by means of a transmitter external to the system.

15. Control system for several appliances according to one of claims 3 and 14,
wherein,
the command generator externally accessible receiver in each appliance is a photodiode which, in response to a modulated light beam directed thereat from a transmitter, an operational address is directly delivered to the selected appliance, for writing into its memory.

* * * * *